United States Patent [19]

Bush

[11] Patent Number: 4,976,378
[45] Date of Patent: Dec. 11, 1990

[54] FEED METERING MECHANISM
[75] Inventor: Jerome J. Bush, Holland, Mich.
[73] Assignee: Hamilton Distributing Company, Hamilton, Mich.
[21] Appl. No.: 497,733
[22] Filed: Mar. 19, 1990

Related U.S. Application Data

[63] Continuation of Ser. No. 236,157, Aug. 25, 1988, abandoned.

[51] Int. Cl.⁵ .............................................. B67D 5/08
[52] U.S. Cl. ........................................ 222/55; 177/83;
177/88; 177/96; 177/111; 222/36; 222/58;
222/77; 222/64; 222/162; 222/181; 222/355;
222/368
[58] Field of Search ......................................... 222/64

[56] References Cited
U.S. PATENT DOCUMENTS

| | | |
|---|---|---|
| 511,647 | 12/1893 | Outcalt .............................. 177/87 X |
| 2,394,476 | 2/1946 | Pipping . |
| 2,470,427 | 5/1949 | Brodie . |
| 2,954,202 | 9/1960 | Bale, Jr. . |
| 3,109,503 | 11/1963 | Recknor et al. . |
| 3,110,420 | 11/1963 | Brewer . |
| 3,403,819 | 10/1968 | Skelton ................................. 222/56 |
| 3,416,708 | 12/1968 | Davis . |
| 3,881,562 | 5/1975 | Hesse . |
| 3,922,126 | 11/1975 | Seaver et al. ...................... 222/77 X |
| 4,378,897 | 3/1983 | Kattelmann . |
| 4,750,576 | 6/1988 | McMennamy ....................... 177/88 |

OTHER PUBLICATIONS

"Automatic Weighers" Brochure.

Primary Examiner—Andres Kashnikow
Assistant Examiner—Gregory L. Huson
Attorney, Agent, or Firm—Price, Heneveld, Cooper, DeWitt & Litton

[57] ABSTRACT

A metering device for measuring bulk particulate material, such as feed, includes a hollow casing having a paddle gate positioned therein. Rotation of the paddle gate dispenses a predetermined weight of particulate material into the outlet port of the device. A monitoring mechanism monitors the back up of dispensed material in the outlet port stopping the flow of material into the metering device should the backed up material reach a predetermined level, thus avoiding jamming of the paddle gate.

12 Claims, 4 Drawing Sheets

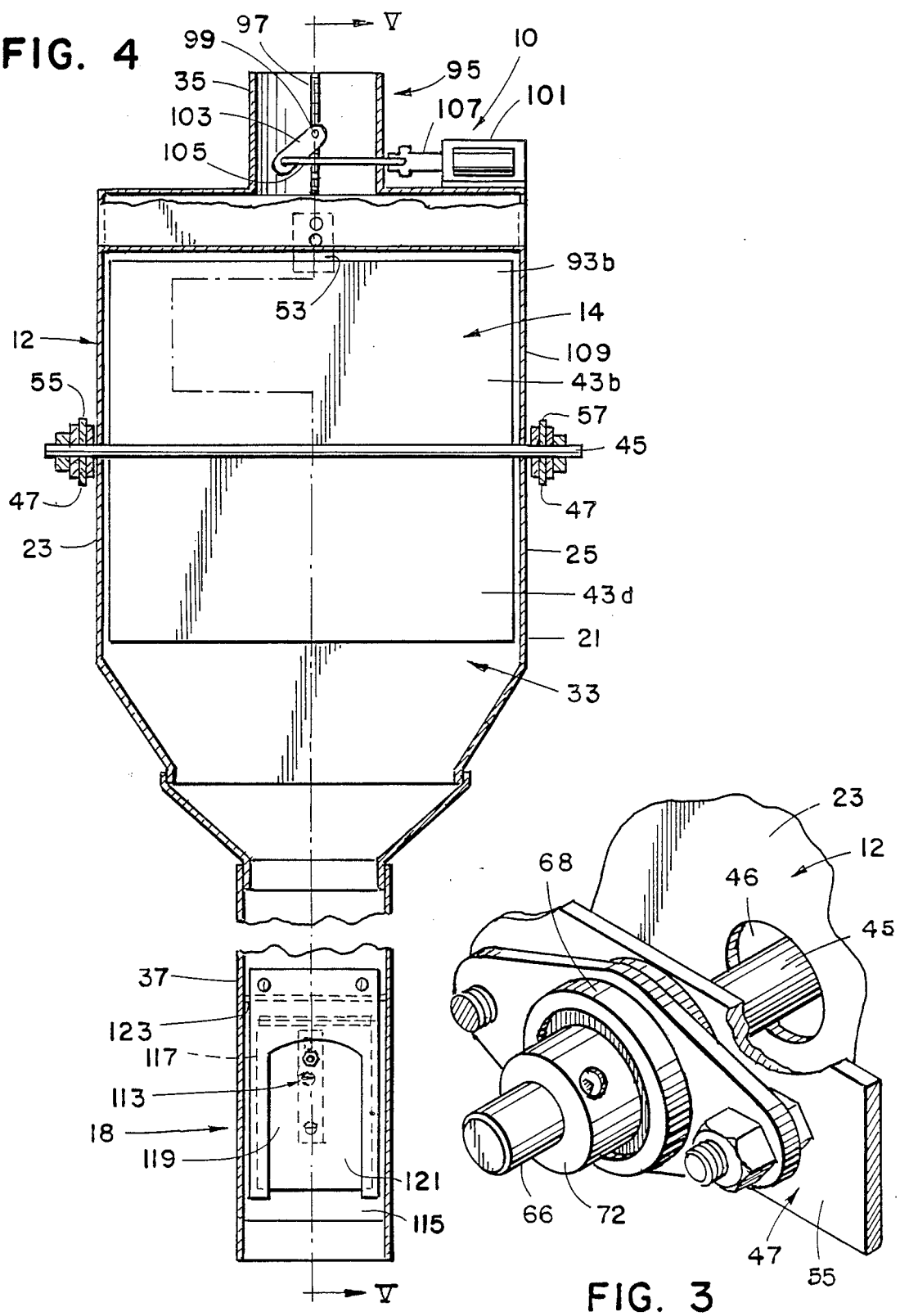

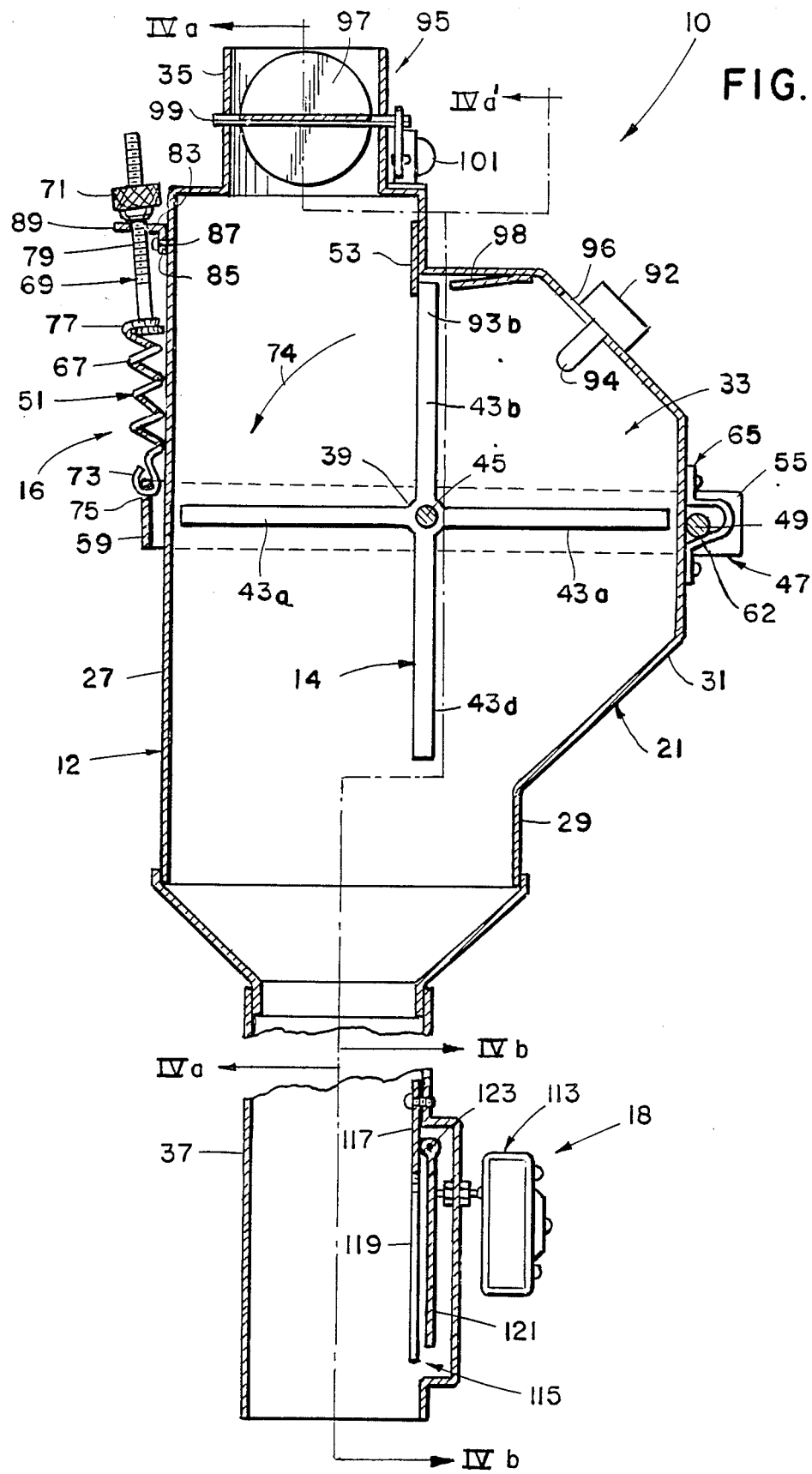

FEED METERING MECHANISM

This is a continuation of copending application Ser. No. 07/236,157 filed on Aug. 25, 1988 and now abandoned.

BACKGROUND OF THE INVENTION

The present invention pertains to metering devices, and in particular to a metering device specially suited for measuring the dispensing of particulate material in bulk.

In the dispensing of bulk particulate material, such as feed, fertilizer, etc., it is highly desirable to monitor the weight of material being dispensed. Heretofore, such metering of material has been accomplished by a device utilizing a paddle gate construction having vanes adapted to receive the inflow of material. The paddle gate is copperatively associated with a regulating mechanism which permits the paddle gate to rotate, and thereby dispense the material, at intervals corresponding to the loading on the gate of a predetermined weight of material. This arrangement then permits the amount of dispensed material to be determined by counting the number of turns of the paddle gate. An example of such a construction is disclosed in U.S. Pat. No. 3,109,503 issued Nov. 5, 1963 to Recknor et al., and entitled WEIGHING AND MEASURING APPARATUS FOR GRANULAR AND THE LIKE MATERIAL.

However, in a continuous state of operation over a period of time, the dispensed material often begins to back up toward the paddle gate when the container or hopper receiving the material has been filled. In the event this situation continues, the paddle gate will generally become lodged against the backed up material in a canted, partially rotated position. In such a loaded position, the metering device will fill with the incoming material, which it continues to receive, and become jammed such that the paddle gate will not continue to rotate even once the container or hopper has been emptied. Hence, to continue operation, the user is then required to disassemble and clean the unit, which is a very labor-intensive and time-consuming task.

SUMMARY OF THE INVENTION

In accordance with the present invention, a unique metering device is provided which monitors and controls the back up of dispensed particulate material.

The metering device includes a rotatable paddle gate having a plurality of vanes which selectively receive a predetermined weight of material thereon before rotating and dispensing the load. Moreover, the device includes a cooperative control means which monitors the back up of dispensed material and functions to stop the inflow of material onto the paddle gate when the backed up dispensed material has reached a predetermined point approaching the gate.

By using the metering device of the present invention, the danger of overfilling the receiving bin and jamming the metering device is obviated. This, in turn, permits the user to perform other tasks without having to steadfastly monitor the filling of the receiving bin to avoid jamming of the device. Further, the need of having to disassemble and clean the metering device is also effectively eliminated.

These and other objects, advantages and features of the present invention will be more fully understood and appreciated by reference to the written specification and appended drawings.

BRIEF DESCRIPTION OF THE DRAWINGS

FIG. 3 is an enlarged fragmentary view of the axle extending through the sidewall and mounting to the frame;

FIG. 4 is a cross-sectional view taken along lines IV—IV in FIG. 5; and

FIG. 5 is a cross-sectional view taken along lines V—V in FIG. 4.

DETAILED DESCRIPTION OF THE PREFERRED EMBODIMENTS

Figure 1:
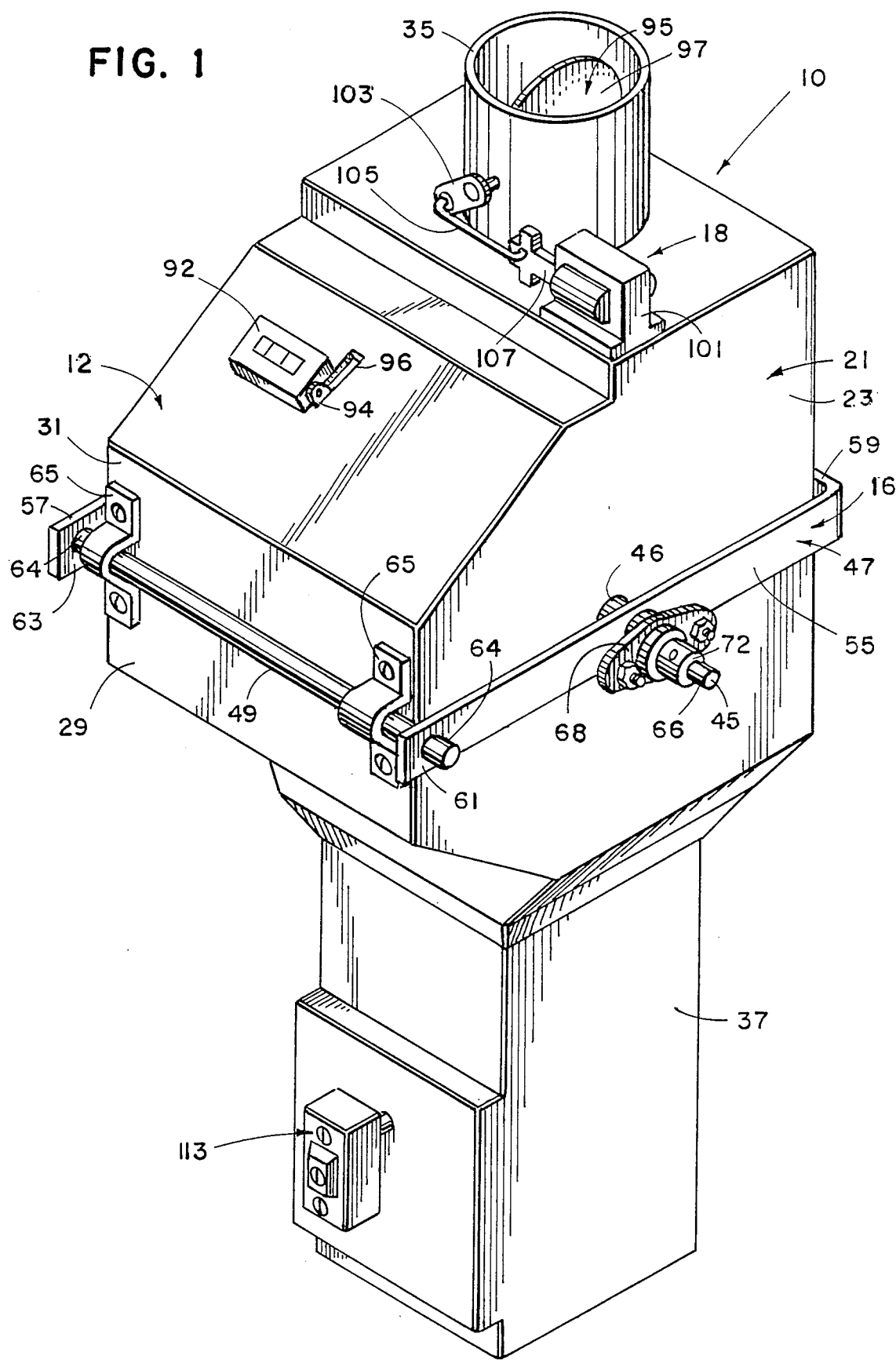
FIG. 1 is a front perspective view of the metering device of the present invention.

In the preferred embodiment, a metering device 10 includes a hollow casing 12, a paddle gate assembly 14, a regulating mechanism 16 and a control means 18. More specifically, paddle gate 14 is received within casing 12 and cooperates with regulating mechanism 16 to weigh the flow of particulate material passing therethrough. Control means 18 operates to monitor the back up of dispensed material and stop the flow of material into metering device 10, should the dispensed material reach a predetermined backed up position.

Casing 12 includes an enlarged hollow body 21 defined by a pair of opposing sidewalls 23, 25, a front wall 27 and a rear wall 29 havign a rearward projecting portion 31. Walls 23, 25, 27, 29 cooperate to form an inner cavity 33 in which is received paddle gate 14. Communicating with cavity 33 is an upper inlet port structure 35 and a lower outlet port structure 37 through which the particulate material flows into and out of cavity 33.

Paddle gate 14 (FIGS. 4 and 5) includes a central hub 39 having a plurality of radially extending vanes 43 and a pair of oppositely extending stub axles 45 projecting axially therefrom. Axles 45 extend outwardly through apertures 46 in sidewalls 23, 25 to rotatably mount paddle gate 14 to regulating mechanism 16. Alternatively, one axle 45 fixedly attached to regulating mechansim 16 may be received through an axial bore in hub 39 to rotatably mount paddle gate 14. Vanes 43 are preferably of a planar configuration and are dimensioned to pass closely along sidewalls 23, 25 and by front and rear walls 27, 29 as paddle gate 14 rotates. In the illustrated embodiment (FIG. 5), four vanes 43a, 43b, 43c, 43d are provided to form paddle gate 14. However, paddle gates having other number of vanes could be utilized.

Further, paddle gate 14 is mounted with a transverse lost motion capability, in a manner to be described below, in order to permit free shifting of the gate 14 in a front-to-back direction. This shifting capacity is needed so that a grain or the like cannot become entrapped between the front wall 27 of casing 12 and the revolving vane 43 approaching it. The amount of shifting available therefore should be at least the size of the largest particle expected to be passed therethrough. Typically, the total amount of shifting allowed would be on the order of three-sixteenths of an inch. Additionally, if desired, paddle gate 14 could be also mounted with lateral lost motion in a side-to-side direction for the same purpose. Apertures 46 are of enlarged dimension to permit the various movements of axles 45, as discussed in more detail below.

Regulating mechanism 16 primarily includes a frame 47, a pivot rod 49, a biasing assembly 51 and an abutment plate 53. These four components 47, 49, 51, 53 all cooperatively interact to selectively regulate the rotation of paddle gate 14 in determining the amount of material to be dispensed with each quarter turn of paddle gate 14. More specifically, frame 47 (FIGS. 1 and 2) has a substantially U-shaped configuration defined by a pair of legs 55, 57 and an interconnecting bight portion 59 which overlie sidewalls 23, 25 and front wall 27, respectively. The rear ends 61, 63 of legs 55, 57 rotatively receive pivot rod 49 through aligned holes 64 to permit pivotal movement thereof (FIG. 1). Pivot rod 49 is secured to rear wall 29 via a pair of brackets 65 or other known means. Brackets 65 loosely receive pivot rod 49 therethrough and thereby accommodate the transverse lost motion capability (front-to-back) needed for paddle gate 14. Further, as seen in FIG. 5, the lower leg 62 of each bracket 65 is inclined to slope downwardly toward casing 12 in order to normally bias paddle gate 14 to its forwardmost position wherein the forward vane 45 lies closely to front wall 27 (e.g., one-sixteenth of an inch). A pair of stops (not shown) are preferably mounted on opposite ends of pivot rod 49, outwardly of frame 47, to maintain it in place. Also, alternatively, frame 47 may be fixed to pivot rod 49 which, in turn, would then be rotatively mounted to casing 12.

As discussed briefly above, axles 45 projects outwardly beyond sidewalls 23, 25, through apertures 46, to rotatively mount to frame (FIG. 3). More particularly, the ends 66 of axles 45 are received through an intermediate portion of legs 55, 57 having, preferably, bearings 68 mounted thereto to reduce the frictional resistance and wearing of parts in the rotation of paddle gate 14. Stops 72 are fixedly attached to axles 45, outwardly of bearings 68, to hold paddle gate 14 in its proper position between sidewalls 23, 25. Stops 72 are eccentrics to lock the shaft to the bearings. They cannot be moved outboard. Side-to-side motion is accomplished by allowing shaft 49 to slide in brackets 65.

Figure 2:
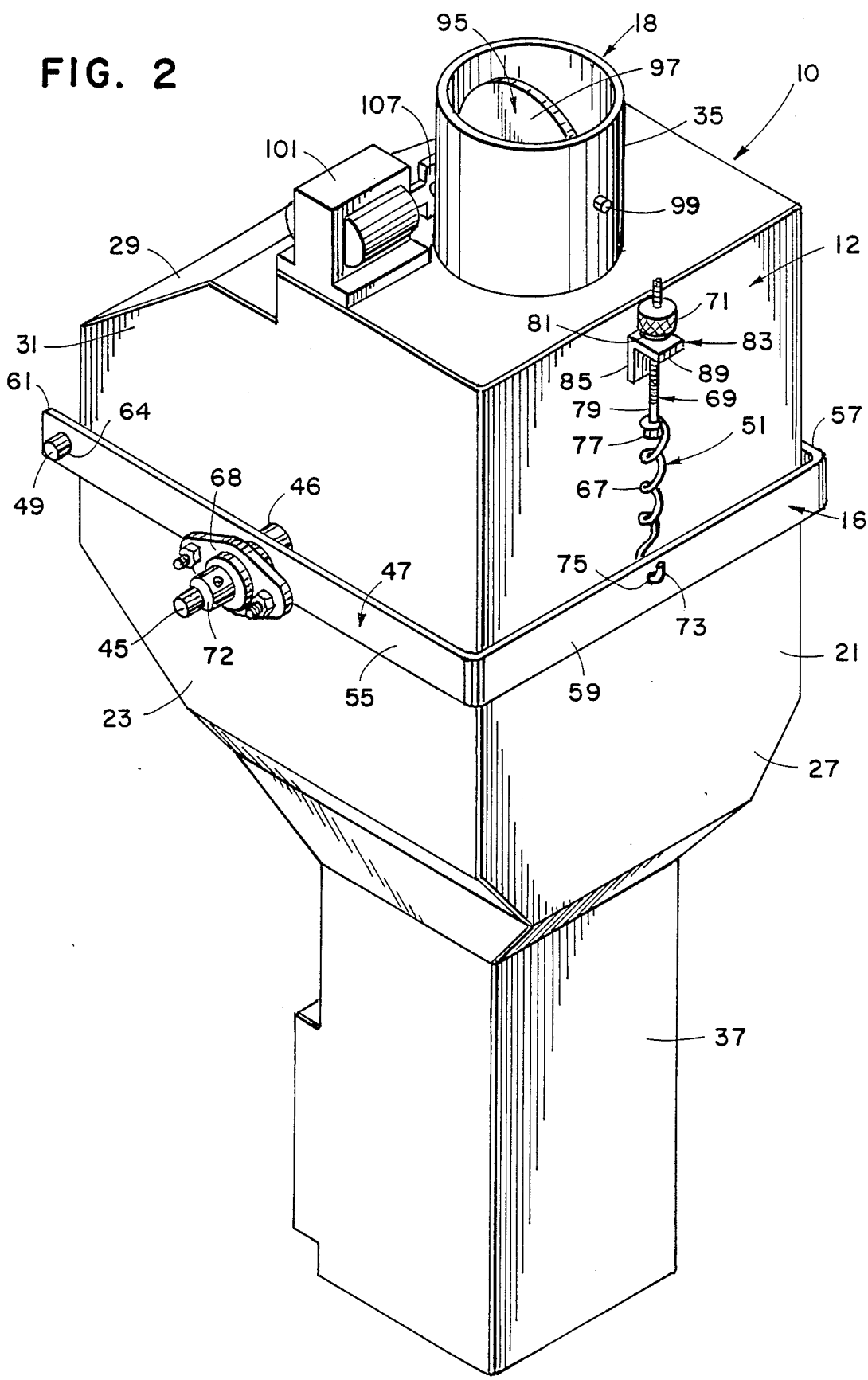
FIG. 2 is a rear perspective view thereof.

Biasing assembly 51 includes a coil spring 67 which interacts between bight portion 59 of frame 47 and front wall 27 of casing 12 to normally bias frame 47 in a raised position (i.e., horizontal) (FIGS. 2 and 5). Preferably, coil springs 67 is configured to form a hook 73, on its lower end, to be received through an aperture 75 provided in bight portion 59 to securely engage spring 67 to frame 47. The upper end of spring 67 is configured to wrap around the head 77 of an adjustment bolt 69 for secure engagement therewith in order to provide an adjustment capability of the force applied to frame 47.

More specifically, the shank 79 of bolt 69 is received upwardly through an opening 81 provided in an abutment flange 83 fixedly secured to front wall 27 of casing 12. Abutment flange 83 is essentially an L-shaped member having a mounting segment 85 secured to front wall 27 via screws 87 (although rivets, welding, etc. may be used), and an abutment segment 89 which projects orthogonally therefrom. Abutment segment 89 operates to support nut 71 which may be threadably moved along bolt 69 to increase or decrease the upward pulling force applied to frame 47 and, hence, in turn paddle gate 14. This adjustment, then, operates to determine the weight of particulate material to be dispensed with each quarter turn of paddle gate 14, as will be discussed below. Further, due to the provision of adjustment bolt 69, the amount dispenseed with each quarter turn may be varied.

In an unloaded condition of paddle gate 14, abutment plate 53 is provided to engage the upwardly positioned vane 43 in order to prevent rotation thereof (FIGS. 4 and 5). However, as the particulate material is deposited upon paddle gate 14, the gate begins to drop downwardly against the bias of coil spring 67. This downward progression continues until the upwardly projecting vane clears plate 53 and rotates counterclockwise in the direction of arrow 74 (as seen in FIG. 5) under the weight of the material.

Additionally, as seen in FIG. 5, coil spring 67 is oriented at an inclination to a true vertical position, so that it, along with or instead of lower legs 62 of brackets 65, normally biases paddle gate 14 to its forwardmost position.

In operation, particulate material is introduced into cavity 33 through inlet port structure 35 such that it is deposited and collects upon outwardly extending vane 43a (FIG. 5). As the amount of material increases thereon, the weight supported by coil spring 67 through axle 45 and frame 47 is likewise increased by a corresponding am spring 67 therefore begins to extend and permit frame 47 to pivot about pivot rod 49. Such pivoting of frame 47 translates into a downward movement for axle 45 and paddle gate 14. This downward progression continues until the distal end 93b of vane 43b clears abutment plate 53.

At this point, the weight on vane 43a forces paddle gate 14 to rotate counterclockwise (as shown in FIG. 5) and thereby drop the material to the outlet port structure 37 for dispensing purposes. Once the particulate material has been dispensed, coil spring 67 is able to retract and pull frame 47, axle 45 and paddle gate 14 upwardly into its normally unloaded position. This upward raising of paddle gate 14 causes vane 43c to abut abutment plate 53 and position vane 43b substantially horizontally under inlet port structure 45 to thereby receive the incoming flow of particulate material therefrom. A rebound stop 98 is preferably provided to prevent the paddle gate 14 from bouncing off of abutment plate 53 and thereby becoming disoriented.

As paddle gate 14 rotates within casing 12, the vanes 43 successively pass counter 92 which registers and tallies each quarter turn of paddle gate 14, so that the user may determine the amount of material dispensed. In the illustrated embodiment, counter 92 is of a conventional design and includes a counting arm 94 which projects through slot 96 and into casing 12. In this position, arm 94 is engaged and pivoted upwardly by the passage of each vane 43 to thereby increase the tally on counter 92 by one.

Control means 18 (FIGS. 4 and 5), monitoring and controlling the amount of particulate material backing up in outlet port structure 37, includes the use of valve 95 and control switch 113 positioned within outlet port structure 37. Control switch 113 is mounted within a recess 115 and is guarded by a fixed shield 117 positioned to partially cover recess 115 and switch 113. Shield 117 operates to guard control switch 113 against fouling or being prematurely actuated by the particulate material normally passing through outlet port structure 37 and into the subsequent receiving bin or the like.

However, when the bin or hopper (not shown) has filled and the particulate material begins to back up into outlet port structure 37, it will pass through opening 119 in shield 117 and press against tongue 121. Tongue 121 may be either pivotally mounted through the use of a pivot pin 123 or alternatively be of a flexible nature and be fixedly mounted at its upper end. In either event, the particulate material will, by moving tongue 121 outwardly, actuate control switch 113. Control switch 113 is electrically connected to solenoid switch 101 which, in turn, operates valve 95 in inlet port structure 35 to control the flow of particulate material passing therethrough.

Valve 95 includes a plate 97 pivotally mounted for movement within inlet port structure 35 by fixedly attached pin 99. Pin 99 is, in turn, operatively coupled to solenoid switch 101 via a pair of links 103, 105 (FIGS. 1 and 4). More specifically, link 103 is fixedly connected to pin 99 at one end and pivotally coupled to link 105 at the other end. To complete the linkage, link 105 is pivotally attached to plunger or armature 107 of solenoid switch 101. In this arrangement, the valve plate 97 is rotated between a closed, horizontal position and an open, vertical position as plunger 107 reciprocates inwardly and outwardly of solenoid 101, respectively.

When the particulate material activates control switch 113, solenoid 101 acts to close valve 95 and stop the inflow of material into cavity 33, in order to avoid jamming of paddle gate 33. The placing of control switch 113 must be positioned low enough in outlet port structure 37 to accommodate at least one dispensed load of material without jamming paddle gate 14. Once the backed up material in outlet port 37 is lowered, release of control switch 113 will once again activate solenoid 101 to open valve 95 and commence loading of paddle gate 14.

Also, as the paddle gate 14 rotates to its new position, particulate material generally continues to flow into carvity 33 through inlet port structure 35. While this causes some leakage and additional flow to pass to outlet port structure 37 after rotation of paddle gate 14 has begun, it is of no consequence, since the leakage will remain substantially constant with each quarter turn of paddle gate 14, and is thereby taken into account during the calibration and subsequent weighting of the material.

Nevertheless, valve 95 (FIGS. 1, 4 and 5), positioned within inlet port structure 35, may be actuated to interrupt the flow of particulate material into cavity 33 when paddle gate 14 is rotated. The control of valve 99 is effected by a microswitch 109 provided within cavity 33 to monitor the movement of vanes 43 (FIG. 5). More specifically, microswitch 109 is preferably mounted to sidewall 25 (or 23) of casing 12 and senses when paddle gate 14 is stopped by abutment plate 53 and when paddle gate 14 has dropped sufficiently and begun its counterclockwise rotation to its next position. More specifically, switch 109 is depressed when paddle gate 14 abuts plate 53 and is released when it is moving. Once switch 109 is released by movement of paddle gate 14, solenoid 101 is actuated to pivot valve plate 97 to a closed position and interrupt the incoming flow of particulate material. When paddle gate 14 once again abuts plate 53 and depresses switch 109, the switch then signals solenoid 101 to open valve 95 and again commence the inflow of the particulate material into cavity 33.

Additionally, if desired, polymeric seals (not shown) may be provided along the periphery of vanes 43 and about enlarged holes 46 to further reduce the leakage encountered during operation of the device.

Of course, it is understood that the above is merely a preferred embodiment of the invention, and that various other embodiments as well as many changes and alterations may be made without departing from the spirit and broader aspects of the invention.

The embodiments of the invention in which an exclusive property or privilege is claimed are defined as follows:

1. A metering device for measuring the weight of particulate material being dispensed, comprising:
    a hollow casing having an inlet port and an outlet port to facilitate the flow of material through said casing;
    a paddle gate rotatively received within said casing and including a number of vanes adapted to selectively receive the material entering through said inlet port, said paddle gate rotating at predetermined intervals to dispense the material to said outlet port;
    a regulating means for controlling the rotation of said paddle gate;
    a control means for monitoring the back up of the material in said outlet port and for interrupting the incoming flow of material into said casing through said inlet port when the material has backed up in said outlet port to a predetermined position, whereby the jamming of the paddle gate through the back up of material is effectively avoided, said control means including a control switch in said outlet port to monitor said back up of particulate meterial therein, and a valve in said inlet port to interrupt the flow of material when said control switch is activated by the backed up material; and
    a paddle gate switching means for sensing the rotation of said paddle gate and actuating said valve to close when said paddle gate is rotating and to open when said paddle gate is stationary.

2. A metering device for measuring the weight of and dispensing a particulate material having a generally predetermined maximum particle size, said device comprising:
    a hollow casing having opposing sidewalls and a front wall, said casing being provided with an inlet port and an outlet port to facilitate the flow of said material through said casing;
    a paddle gate mounted between said opposing sidewalls, said gate including a number of vanes adapted to selectively receive the material entering said casing through said inlet port, said paddle gate being mounted within said casing for rotation from a first position in which one of said vanes is positioned closely adjacent said front wall effectively blocking the flow of material through said casing to succeeding positions wherein succeeding vanes are positioned closely adjacent said front wall effectively blocking the flow of material through said casing to incrementally dispense the material to said outlet port, said paddle gate being transversely shiftable away from said front wall when in any of said first or succeeding positions a distance sufficient to prevent particulate material having said generally predetermined maximum particle size from being lodged between said vanes and said front wall, and thereby jamming of said paddle gate; and
    a regulating means for controlling the rotation of said paddle gate, said regulating means including a frame, a stop and a biasing assembly, wherein:

said frame is pivotally mounted to said casing by a mounting structure for movement between a raised position and a lowered position, said mounting structure including means for mounting said frame such that it and the padle gate which it rotatively supports are shiftable transversely with respect to said casing, and wherein said frame rotatively supports said paddle gate;

said stop is positioned to engage said paddle gate and prevent rotation thereof when said frame is in said raised position and release said paddle gate for rotation when said frame is in said lowered position;

said biasing assembly functions to bias said frame into said raised position, and further biases said frame and the paddle gate which it rotatively supports transversely toward said front wall of said casing.

3. The metering device of claim 2 wherein said mounting structure includes at least one inclined surface which normally biases said frame and the paddle gate which it rotatively supports transversely toward said front wall of said casing.

4. A metering device for measuring the weight of particulate material being dispensed, comprising:
   a hollow casing having an inlet port and an outlet port to facilitate the flow of material through said casing;
   a paddle gate rotatively received within said casing and including a number of vanes adapted to selectively receive the material entering through said inlet port, said paddle gate rotating at predetermined intervals to dispense the material to said outlet port;
   a regulating means for controlling the rotation of said paddle gate, said regulating means including a frame, a stop and a biasing assembly, wherein:
      said frame is pivotally mounted to said casing for movement between a raised position and a lowered position, and rotatively supports said paddle gate;
      said top is positioned to engage said paddle gate and prevent rotation thereof when said frame is in said raised position and release said paddle gate for rotation when said frame is in said lowered position; and
      said biasing assembly functions to bias said frame into said raised position and includes a coil spring having a pair of ends, wherein one end is attached to said frame and the other end is adjustably secured to said casing, whereby the biasing force applied to said frame is adjustable; and
   a control means for monitoring the back up of the material in said outlet port and for interrupting the incoming flow of material into said casing through said inlet port when the material has backed up in said outlet port to a predetermined position, whereby the jamming of the paddle gate through the back up of material is effectively avoided.

5. The metering device of claim 4 in which said frame is further mounted for generally horizontal transverse shifting so that said paddle gate can shift transversely to accommodate the passage of a particulate between said vanes and said casing, and thereby avoid lodging of the particulate therebetween and jamming of said paddle gate.

6. The metering device of claim 5 in which said casing further includes a side surface which is positioned adjacent said vanes when they receive the particulate material from said inlet port, and wherein said biasing means further biases said frame transversely so that said paddle gate is normally biased toward said side surface of said casing.

7. The metering device of claim 5 in which said casing further includes a side surface which is positioned adjacent said vanes when they receive the particulate material from said inlet port and a structure for pivotally mounting said frame to said casing, wherein said structure includes at least one inclined surface which normally biases said frame transversely so that said paddle gate is normally biased toward said side surface of said casing.

8. A metering device for measuring the weight of particulate material being dispensed, comprising:
   a hollow casing having an inlet port and an outlet port to facilitate the flow of material through said casing;
   a paddle gate rotatively received within said casing and including a number of vanes adapted to selectively receive the material entering through said inlet port, said paddle gate rotating at predetermined intervals to dispense the material to said outlet port;
   a regulating means for controlling the rotation of said paddle gate in response to the weight of particulate material thereon, said regulating means including a frame, a stop and a biasing assembly wherein:
      said frame is pivotally mounted to said casing for movement between a raised position and a lowered position, and rotatively supports said paddle gate;
      said stop is positioned to engage said paddle gate and prevent rotation thereof when said frame is in said raised position and release said paddle gate for rotation when said frame is in said lowered position; and
      said biasing assembly includes means for biasing said frame into said raised position; and
   a control means for monitoring the back up of the material in said outlet port and valve means positioned within said inlet port and controlled by said control means for interrupting the incoming flow of material into said casing through said inlet port when the material has backed up in said outlet port to a predetermined position, whereby the jamming of the paddle gate through the back up of material is effectively avoided.

9. The metering device of claim 8 in which said paddle gate is adjustably mounted for transverse shifting within said casing, whereby said paddle gate can shift to accommodate the passage of a particulate between said vanes and said casing, and thereby avoid lodging of the particulate therebetween and jamming of said paddle gate.

10. The metering device of claim 8 in which said control means includes a control switch in said outlet port to monitor said back up to particulate material therein, and a valve in said inlet port to interrupt the flow of material when said control switch is activated by the backed up material.

11. The metering device of claim 10 further including a shield partially covering said control switch to prevent fouling and premature actuation of said control switch by material being normally dispensed through said outlet port, and to permit the backed up material to activate said control switch.

12. The metering device of claim 11 in which said outlet port is defined by at least one sidewall to form an outlet passage for the material, and in which said outlet port further includes a recessed portion in said sidewall into which is received said control switch.

* * * * *

UNITED STATES PATENT AND TRADEMARK OFFICE
CERTIFICATE OF CORRECTION

PATENT NO. : 4,976,378

DATED : December 11, 1990

INVENTOR(S) : Jerome J. Bush

It is certified that error appears in the above-identified patent and that said Letters Patent is hereby corrected as shown below:

Column 1, line 19:    "copperatively" should be -- cooperatively --;

Column 1, line 36:    "loaded" should be -- lodged --;

Column 2, line 30:    "havign" should be -- having --;

Column 3, line 29:    "projects" should be -- project --;

Column 3, line 31:    After "frame" insert -- 47 --;

Column 3, line 46:    "springs" should be -- spring --;

Column 4, line 1:     "dispenseed" should be -- dispensed --;

Column 4, line 24:    Delete "am" and insert therefor -- amount. Coil --;

Column 5, line 36:    "carvity" should be -- cavity --;

Column 5, line 42:    "weighting" should be -- weighing --;

Column 6, claim 1, line 31: "meterial" should be -- material --;

Column 7, claim 2, line 5:  "padle" should be -- paddle --;

Column 8, claim 10, line 54: "up to" should be -- up of --.

Signed and Sealed this

Twelfth Day of May, 1992

*Attest:*

DOUGLAS B. COMER

*Attesting Officer*    *Acting Commissioner of Patents and Trademarks*